Figure 1:
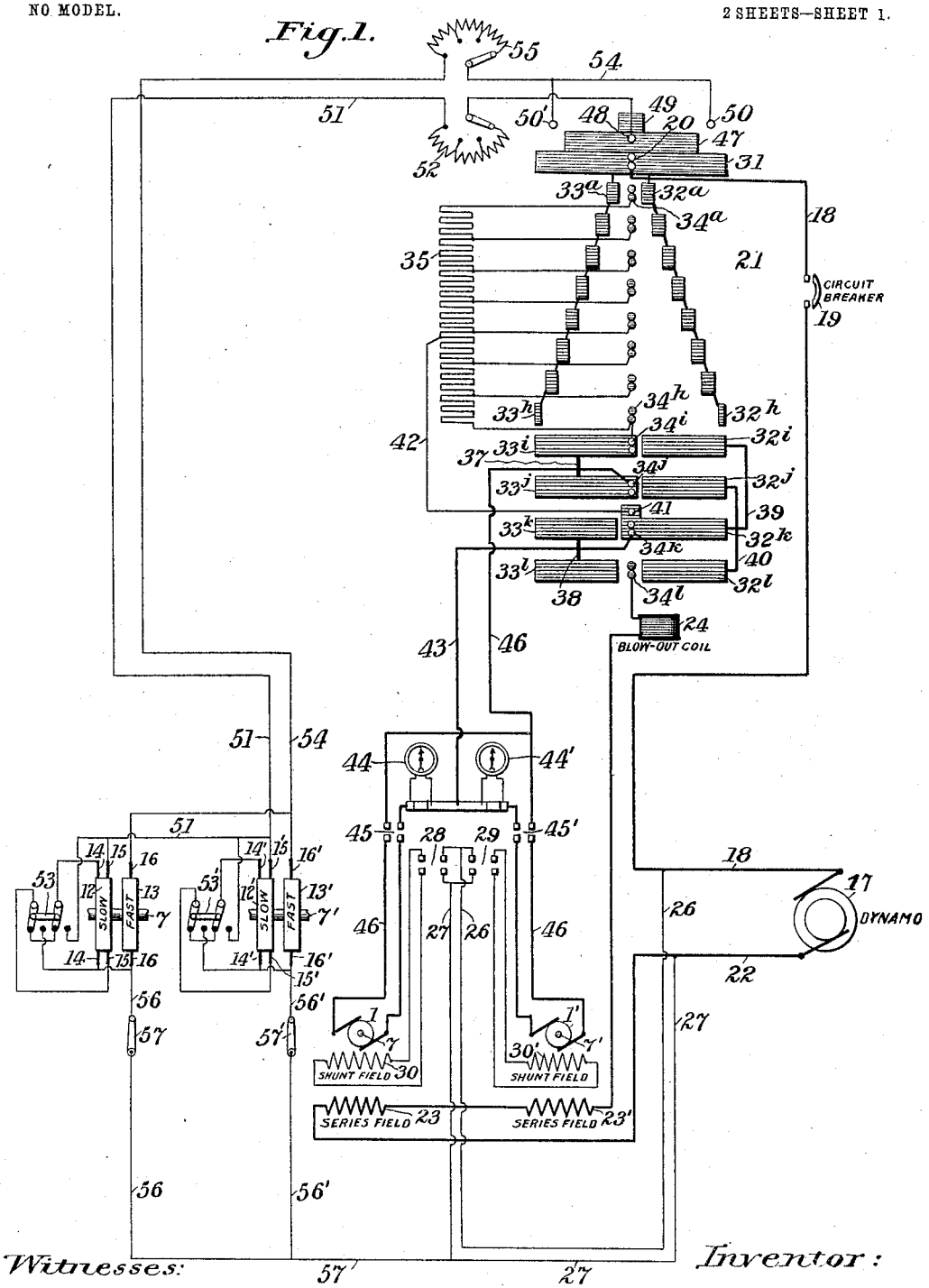

No. 773,950. PATENTED NOV. 1, 1904.
O. P. LOOMIS.
ELECTRIC TURRET OPERATING MECHANISM.
APPLICATION FILED DEC. 16, 1903.
NO MODEL. 2 SHEETS—SHEET 1.

Witnesses:
R. A. Balderson.
Julia B. Hell.

Inventor:
Osborn P. Loomis,
by Byrnes & Townsend,
Att'ys:

No. 773,950. PATENTED NOV. 1, 1904.
O. P. LOOMIS.
ELECTRIC TURRET OPERATING MECHANISM.
APPLICATION FILED DEC. 16, 1903.
NO MODEL. 2 SHEETS—SHEET 2.
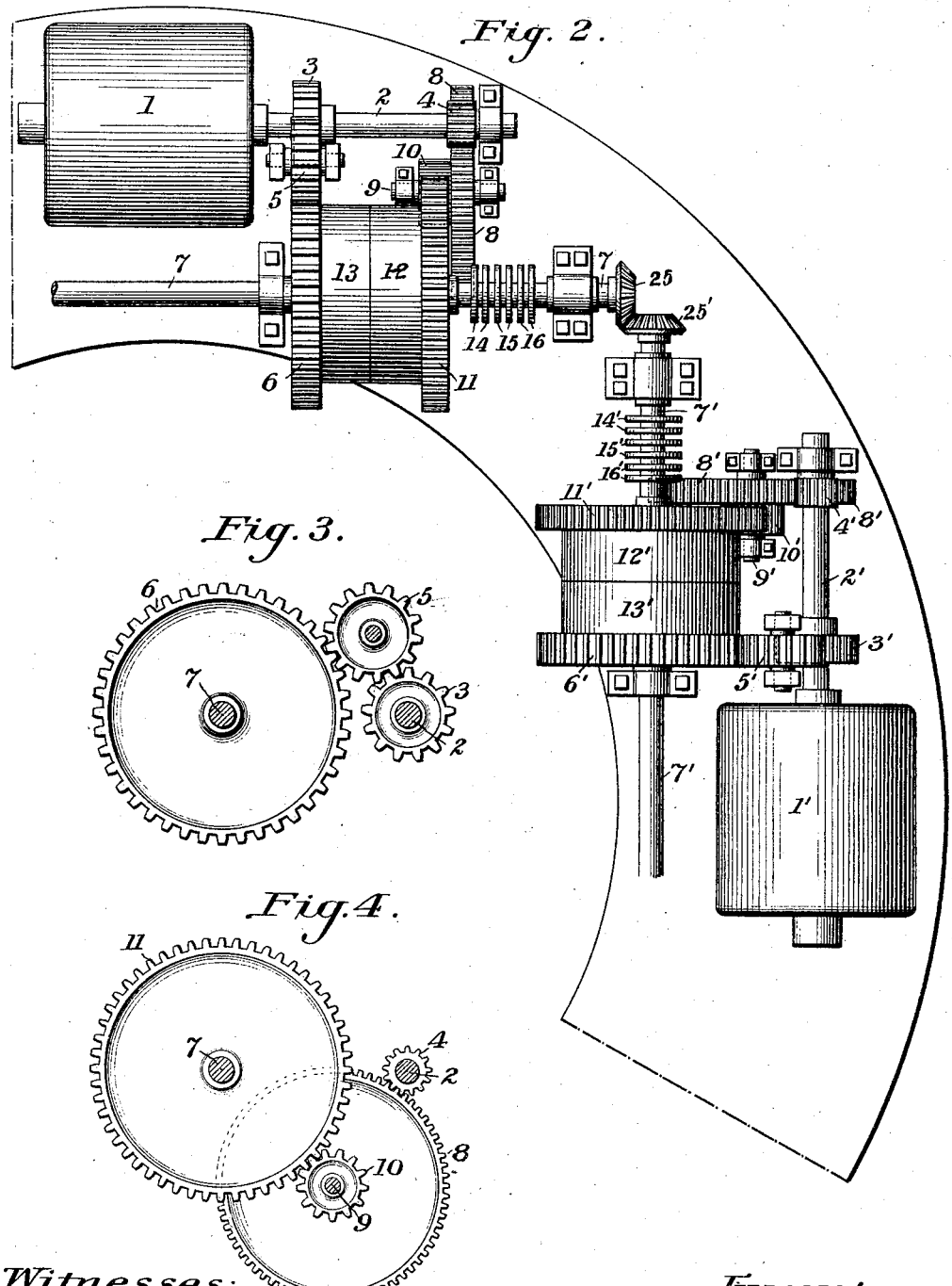

No. 773,950.

Patented November 1, 1904.

UNITED STATES PATENT OFFICE.

OSBORN P. LOOMIS, OF NEWPORT NEWS, VIRGINIA.

ELECTRIC TURRET-OPERATING MECHANISM.

SPECIFICATION forming part of Letters Patent No. 773,950, dated November 1, 1904.

Application filed December 16, 1903. Serial No. 185,389. (No model.)

*To all whom it may concern:*

Be it known that I, OSBORN P. LOOMIS, a citizen of the United States, residing at Newport News, in the county of Warwick and State of Virginia, have invented certain new and useful Improvements in Electric Turret-Operating Mechanism, of which the following is a specification.

This mechanism is designed to rotate the turrets of war vessels at a variable speed ranging from the low speed requisite for the sighting of the guns through intermediate steps to a relatively high speed.

The preferred mechanism comprises two electric motors, sets of low and high speed gears and electromagnetic clutches interposed between the shaft of each motor and the turret-driving shaft, an electric controller with segments for reversing and varying the speed of the motors for braking the motors by short-circuiting their armatures through a low resistance and for energizing the clutch of either set of gears, and rheostats for varying the electric current supplied to the clutches. The clutch of the low-speed gears preferably has two windings, which are normally coupled in series, but may be thrown in parallel by a suitable switch when an especially great tractive effect is necessary.

Referring to the accompanying drawings, Figure 1 is a diagrammatic view of the motors, clutches, controller, rheostats, and switches, showing the electric circuits. Fig. 2 is a plan view of the electric motors, gears, and clutches; and Figs. 3 and 4 are side elevations of the sets of high and low speed gears, respectively.

Referring to Fig. 2, each of the electric motors 1 1' has a shaft 2 2', which carries the driving-pinions of the sets of high and low speed gears. The gear and clutch mechanism of the two motors being identical, that of the upper motor only will be described in detail. The set of high-speed gears (shown in Fig. 3) comprises a pinion 3, keyed on the motor-shaft 2, an idler 5, and a spur-gear 6, revolubly supported on the turret-driving shaft 7. The set of low-speed gears comprises a pinion 4, keyed on the motor-shaft 2 and meshing with a spur-gear 8, keyed on a counter-shaft 9, and a pinion 10, also keyed on the shaft 9 and engaging a spur-gear 11, revolubly supported on the turret-driving shaft 7. The electromagnetic clutches 12 13 are keyed on the shaft 7 between the spur-gears 11 6, the clutch 12 causing the spur 11 to rotate with the shaft 7 and the clutch 13 causing the spur 6 to rotate with this shaft. The clutches 12 13 may be of any well-known construction; but the clutch 12 of the low-speed gears preferably has two independent windings, the ends of which are carried out to two pairs of terminal rings 14 15, respectively. The terminals of the clutch 13 are carried out to a pair of rings 16. The turret-driving shafts 7 7' of the two motors are preferably geared together by the bevel-gears 25 25'.

Referring to Fig. 1, one of the mains, 18, of the dynamo 17, which supplies current, is carried through a circuit-breaker 19 to the finger 20 of the controller 21. The other main, 22, of the dynamo leads to the series field 23 23' of the motors and thence through the blow-out coil 24 to the finger 34' of the controller. Shunt connections 26 27 lead from the mains 18 22 through switches 28 29 to the shunt-fields 30 30' of the motors. The cylinder of the controller 21 carries a long segment 31, which remains in contact with the finger 20 in all positions. It also carries a set of eight short segments $32^a$ to $32^h$, which are connected to each other and to the segment 31, and a similar set of reversing-segments $33^a$ to $33^h$. The segments 32 or 33 of each set are adapted to successively contact with fingers $34^a$ to $34^h$, which are connected to successive sections of the controller-rheostat 35. The terminal finger $34^h$ of the rheostat is connected to a finger $34^i$, with which a long segment $33^i$ normally contacts when the controller is in its inoperative position. The segment $33^i$ has a permanent connection 37 with a similar long segment $33^j$, which bears on a finger $34^j$ when the controller is thrown off. Beneath the segment $33^j$ is a pair of somewhat shorter segments $33^k$ $33^l$, which have a permanent connection 38. Beneath the segment $32^h$ is a pair of long segments $32^i$ $32^k$, which have a permanent connection 39, and another pair of long segments 32$^j$ to 32$^l$, which have a permanent connection 40. The segment 32$^k$ has an offset portion at its inner end which bears on a finger 41 when the controller is in its inoperative position, as well as on the finger 34$^k$. The finger 41 is connected to the lower part of the rheostat 35 by a wire 42. A cable 43 leads from the finger 34$^k$ through the ammeters 44 44' and main switches 45 45' to the armatures of the motors 1 1', from which return-cables 46 lead to the controller-finger 34$^j$. Above the controller-segment 31 and connected thereto is a somewhat shorter centrally-arranged section 47, which bears on a finger 48. Above the segment 47 is a short central segment 49, which can be thrown into contact with either of the fingers 50 50' at the right and left, respectively. A cable 51 leads from the finger 48 through a variable resistance 52 to the upper terminal rings 15 15' of the clutches 12 12'. The lower rings 15 15' are connected to the left-hand arms of the switches 53 53', which normally bear on the first contact-points. The second contacts of these switches are connected to the lower terminal rings 14 14' 16 16' of both clutches 12 12' and 13 13'. The first contact of each of these switches is connected to the third contact, and the fourth contact of each is connected to the cable 51. The right-hand arm of each of the switches 53 53' is connected to the upper rings 14 14'. A cable 54 leads from the controller-fingers 50 50' through a variable resistance 55 to the upper rings 16 16'. Cables 56 56' lead from the lower rings 16 16', respectively, through switches 57 57' to the shunt connection 27 of the supply-main 22. When the controller is in the position shown in Fig. 1, the armatures of the motors are short-circuited by the connection 42 through the lower part of the rheostat 35. This short circuit tends to prevent any accidental movement of the motor-shafts and is equivalent to a mechanical brake. When it is desired to rotate the turret, the controller-cylinder is turned to bring the segments 32 or 33 in contact with the fingers 34, according to the desired direction of rotation. Assuming that the cylinder is turned to bring the segments 32 successively upon the fingers 34, the current from the dynamo reaching the controller through the main 18 and finger 20 will pass first through the segments 31 32$^a$, the finger 34$^a$, and the entire rheostat 35 and successively through smaller portions thereof until the segment 32$^h$ contacts with the finger 34$^h$, whereupon the current will pass directly from the segment 31 through the short segments 32 to the finger 34$^h$ and thence to the finger 34$^i$. The armature-circuits will then be completed through the segments 32$^i$, connection 39, segment 32$^k$, finger 34$^k$, cables 43 46, finger 34$^j$, segment 32$^j$, connection 40, segment 32$^l$, and finger 34$^l$, returning through the series fields to the main 22. The motors will thereby be gradually brought to full speed. When the controller and the clutch-switches 53 53' and 57 57' are in the position shown in Fig. 1, the current will pass through the controller-finger 20 and segment 31 to the segment 47 and thence through the finger 48 and cable 51 and through one of the windings of the clutches 12 12', thence through the switches 53 53', through the other winding of the clutches 12 12', and back through the connection 27 to the dynamo. The set of low-speed gears will thereby be clutched to the turret-driving shaft, the turret thus being set in rotation with a speed which increases as successive portions of the controller-rheostat 35 are cut out. When the rheostat 35 is entirely cut out by bringing the segment 32$^h$ on the finger 34$^h$, the segment 47 leaves the finger 48 and the segment 49 makes contact with the finger 50', thereby diverting current from the clutches 12 12' to the clutches 13 13' and clutching the high-speed gears to the turret-driving shaft, rotating the turret at its maximum speed. The switches 53 53' when thrown from the left to the right connect the two windings of each of the low-speed clutches 12 12' in parallel instead of in series, thereby greatly increasing their tractive effect. This parallel connection is usually unnecessary, being employed when the turret offers an unusual resistance to rotation either by reason of the inclination of the ship or disarrangement of the turret.

The resistance 52 in the slow-speed clutch-circuit also serves as a means for increasing the tractive effect of the clutches 12 12' and may be used in lieu of or in addition to the switches 53 53'. The arm of this rheostat is normally set to throw the entire resistance into circuit, and portions of the resistance are cut out as it becomes necessary to increase the power of the clutches. The similar resistance 55 in the high-speed-clutch circuit is useful to regulate the current supplied to the clutches 13 13'.

The provision of clutches on the driven shaft instead of the motor-shaft affords the important advantage that the low-speed gears always run at the same rate relative to that of the motor-shaft. When the clutches are placed on the motor-shaft, as is customary, and the high-speed gears are thrown into operation, the low-speed gears are rotated at an abnormally high rate of speed by the driven shaft with loss of power and excessive noise.

A shunt-wound motor may be employed, but a compound-wound one is preferable to secure greater torque when the high-speed clutch is thrown into circuit. It will be noted that the series field-coils are connected in series to give the same field in both motors.

While this mechanism is especially adapted for the operation of gun-turrets, it is obvious that it is suited for many other uses, especially for machinery having heavy moving parts and the operation of which is intermittent.

I claim—

1. An electric turret-operating mechanism, comprising an electric motor having a driving-shaft, a driven shaft, a set of gears including a pinion fixed on said driving-shaft and a gear revolubly supported on said driven shaft, an electromagnetic clutch on said driven shaft in operative relation to said gear, and a motor-controller having contacts for energizing said clutch, as set forth.

2. An electric turret-operating mechanism, comprising an electric motor having a driving-shaft, a driven shaft, sets of low and high speed gears, each including a pinion fixed on said driving-shaft and a gear revolubly supported on said driven shaft, electromagnetic clutches on said driven shaft in operative relation to said gears, and a motor-controller having contacts for energizing either of said clutches, as set forth.

3. An electric turret-operating mechanism, comprising an electric motor having a driving-shaft, a driven shaft, sets of low and high speed gears, each including a pinion fixed on said driving-shaft and a gear revolubly supported on said driven shaft, electromagnetic clutches on said driven shaft in operative relation to said gears, and a reversing motor-controller having contacts for successively energizing the low and high speed clutches when the controller is operated to rotate the motor in either direction, as set forth.

4. An electric turret-operating mechanism, comprising a motor having a driving-shaft, a driven shaft, a set of gears including a pinion on said driving-shaft and a gear on said driven shaft, an electromagnetic clutch for said gears having separate windings, and a switch for coupling said windings either in parallel or in series, as set forth.

5. An electric turret-operating mechanism, comprising an electric motor having a driving-shaft, a driven shaft, a set of gears including a pinion fixed on said driving-shaft and a gear revolubly supported on said driven shaft, an electromagnetic clutch on said driven shaft in operative relation to said gear, said clutch having separate windings, and a switch for coupling said windings either in parallel or in series, as set forth.

6. An electric turret-operating mechanism, comprising an electric motor having a driving-shaft, a driven shaft, sets of low and high speed gears, each including a pinion fixed on said driving-shaft and a gear revolubly supported on said driven shaft, electromagnetic clutches on said driven shaft in operative relation to said gears, the low-speed clutch having separate windings, and a switch for coupling said windings in parallel or in series, as set forth.

7. An electric turret-operating mechanism, comprising a motor having a driving-shaft, a driven shaft, a set of gears including a pinion on said driving-shaft and a gear on said driven shaft, an electromagnetic clutch for said gears having separate windings, a switch for coupling said windings either in parallel or in series, a resistance normally interposed in the circuit of said clutch, and means for cutting out said resistance as required, as set forth.

8. An electric turret-operating mechanism, comprising an electric motor having a driving-shaft, a driven shaft, sets of low and high speed gears, each including a pinion fixed on said driving-shaft and a gear revolubly supported on said driven shaft, electromagnetic clutches on said driven shaft in operative relation to said gears, a resistance normally interposed in the circuit of the low-speed clutch, and means for cutting out said resistance as required, as set forth.

9. An electric turret-operating mechanism, comprising an electric motor having a driving-shaft, a driven shaft, sets of low and high speed gears, each including a pinion fixed on said driving-shaft and a gear revolubly supported on said driven shaft, electromagnetic clutches on said driven shaft in operative relation to said gears, a resistance normally interposed in the circuit of each clutch, and means for cutting out said resistances as required, as set forth.

10. An electric turret-operating mechanism, comprising an electric motor having a driving-shaft, a driven shaft, sets of low and high speed gears, each including a pinion fixed on said driving-shaft and a gear revolubly supported on said driven shaft, electromagnetic clutches on said driven shaft in operative relation to said gears, the low-speed clutch having separate windings, a switch for coupling said windings in parallel or in series, a resistance normally interposed in the circuit of the low-speed clutch, and means for cutting out said resistance as required, as set forth.

11. An electric turret-operating mechanism, comprising an electric motor having a driving-shaft, a driven shaft, a set of gears including a pinion fixed on said driving-shaft and a gear revolubly supported on said driven shaft, an electromagnetic clutch on said driven shaft in operative relation to said gear, a motor-rheostat, and a motor-controller having contacts for short-circuiting the motor-armature through a portion of said resistance when the current is cut off, as set forth.

12. An electric turret-operating mechanism, comprising an electric motor having a driving-shaft, a driven shaft, sets of low and high speed gears, each including a pinion fixed on said driving-shaft and a gear revolubly supported on said driven shaft, electromagnetic clutches on said driven shaft in operative relation to said gears, a motor-rheostat, and a motor-controller having contacts for short-circuiting the motor-armature through a portion of said resistance when the current is cut off, as set forth.

13. An electric turret-operating mechanism, comprising electric motors, each having shunt and series field-windings, the series windings of the motors being in series, as set forth.

14. An electric turret-operating mechanism, comprising electric motors, each having shunt and series field-windings, the series windings of the motors being in series, sets of low and high speed gears driven by each motor, each set of gears including a member revolubly supported on a driven shaft, and electromagnetic clutches on said shaft in operative relation to said gears, as set forth.

In testimony whereof I affix my signature in presence of two witnesses.

OSBORN P. LOOMIS.

Witnesses:
 A. L. HOPKINS,
 CHAS. F. BAILEY.